United States Patent [19]
Berg

[11] Patent Number: 6,118,553
[45] Date of Patent: Sep. 12, 2000

[54] COMPACT MOTOR DRIVE AND ACTIVE SPEED GOVERNOR WITH OPTICAL ENCODER FOR SCANNER MECHANISMS

[75] Inventor: Thomas E. Berg, Fort Collins, Colo.

[73] Assignee: Hewlett-Packard Company, Palo Alto, Calif.

[21] Appl. No.: 09/014,863

[22] Filed: Jan. 28, 1998

[51] Int. Cl.[7] .................................................. H04N 1/024
[52] U.S. Cl. ............................................................ 358/473
[58] Field of Search .................................... 358/473, 474; 382/312, 313; 318/10, 15; 74/724

[56] References Cited

U.S. PATENT DOCUMENTS

| | | | |
|---|---|---|---|
| 4,703,186 | 10/1987 | Nakayama et al. | 250/566 |
| 4,819,083 | 4/1989 | Kawai et al. | 358/294 |
| 4,899,228 | 2/1990 | Sano et al. | 358/473 |
| 4,969,054 | 11/1990 | Tsuji et al. | 358/473 |
| 5,182,450 | 1/1993 | Pan | 250/234 |
| 5,301,243 | 4/1994 | Olschafskie et al. | 382/59 |
| 5,306,908 | 4/1994 | McConica et al. | 250/234 |
| 5,381,020 | 1/1995 | Kochis et al. | 250/566 |
| 5,410,347 | 4/1995 | Steinle et al. | 348/270 |
| 5,434,680 | 7/1995 | Noda et al. | 358/471 |
| 5,457,371 | 10/1995 | Gordon | 318/661 |
| 5,459,588 | 10/1995 | McVicar et al. | 358/473 |
| 5,552,597 | 9/1996 | McConica | 250/234 |
| 5,586,212 | 12/1996 | McConica | 385/146 |
| 5,595,445 | 1/1997 | Bobry | 358/473 |
| 5,669,033 | 9/1997 | Takata et al. | 74/724 |
| 5,760,485 | 6/1998 | Shiga et al. | 290/48 |

FOREIGN PATENT DOCUMENTS

| | | |
|---|---|---|
| 0168256 | 1/1986 | European Pat. Off. . |
| 0270686 | 6/1988 | European Pat. Off. . |
| WO 8801123 | 2/1988 | WIPO . |

OTHER PUBLICATIONS

Patent Abstracts of Japan– Patentee: Canon Inc., Pat. No. A4319857, Pat. date Oct. 11, 1992 for "Image Reader" Inventor: Nakajima Yoshiaki, et al. vol. 17 No. 152.

Patent Abstracts of Japan—Patentee: Mitsubishi Electric Corp., Pat. No. A63042275, Pat. date Feb. 23, 1988 for "Handy Image Reader" Inventor: Naruki Toshimasa, vol. 12 No. 256.

*Primary Examiner*—Jerome Grant, II

[57] ABSTRACT

A compact drive assembly for a hand-held scanner device may comprise a roller mounted for rotation in the hand-held scanner device and a motor having an output shaft. A first worm mounted to the output shaft of the motor engages a first worm gear. A second worm is operatively associated with the first worm gear so that the second worm rotates with the first worm gear. A second worm gear mounted to the roller engages the second worm so that the motor drives the roller via the first worm, the first worm gear, the second worm and the second worm gear. An encoder assembly operatively associated with the second worm provides an indication of the angular position of the second worm. A control system operatively associated with the encoder assembly and the motor operates the motor to drive the roller within a predetermined speed range.

17 Claims, 6 Drawing Sheets

COMPACT MOTOR DRIVE AND ACTIVE SPEED GOVERNOR WITH OPTICAL ENCODER FOR SCANNER MECHANISMS

FIELD OF INVENTION

This invention relates to hand-held imaging devices in general and more specifically to motor drive systems for hand-held scanner devices.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include an illumination system and an optical system to accomplish scanning of the object. The illumination system illuminates the object and the optical system collects light reflected by the illuminated object and focuses a small area of the illuminated object, usually referred to as a "scan region" or "scan line," onto the surface of a photosensitive detector positioned within the scanner. Image data representative of the entire object then may be obtained by sweeping the illuminated scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Many hand-held scanner devices include a power drive system to assist the user in moving the hand-held scanner device over the object being scanned. One type of power drive system may even include a speed control system to ensure that the user moves the hand-held scanner over the object within an appropriate speed range to ensure good scanning performance. Still another type of power drive system may incorporate a battery recharging system to allow an on-board battery to be recharged by the drive system, such as, for example, if the user attempts to move the hand-held scanner device over the object at a speed faster than the maximum scanning speed for the particular application.

Regardless of the particular features of the power drive system, most power drive systems are not without their problems and disadvantages. For example, one type of power drive system utilizes a relatively low torque drive motor. While such a low torque drive motor has the advantage of being physically small and relatively inexpensive, it requires a gear box or transmission assembly having a high reduction ratio (typically involving several stages of spur gears) to provide the relatively high torque required by the drive roller. Unfortunately, high-reduction ratio transmission assemblies typically involve a high parts count, increased assembly time, and cost. In addition, such transmissions may have relatively low efficiencies. Such high reduction ratio transmissions may also include a significant amount of backlash which can complicate position tracking and speed regulation, if such systems are provided.

Partly in an effort to eliminate some of the problems associated with the foregoing power drive systems, other types of drive systems have been developed that utilize high torque motors. Such high torque motors are capable of providing the required torque to the drive wheels or rollers, but without the need for transmissions having large reduction ratios. Unfortunately, however, the high torque motors are usually physically larger, more expensive, and usually produce more noise than low torque motors. Another problem is that the motors draw more current, which means that the electronic control system which supplies power to the motor must have a higher current rating.

All in all then, both types of drive systems involve various trade-offs and neither type of power drive system has a clear advantage over the other. Consequently, a need remains for a power drive system for hand-held scanner devices that is relatively small and compact to allow the overall hand-held scanner device to be made as small as possible. Additional advantages could be realized if such a compact drive system included a minimum number of components, but without the need for relatively large, high-torque drive motors or for transmission systems involving multiple stages.

SUMMARY OF THE INVENTION

A compact drive assembly for a hand-held scanner device may comprise a roller mounted for rotation in the hand-held scanner device and a motor having an output shaft. A first worm mounted to the output shaft of the motor engages a first worm gear. A second worm is operatively associated with the first worm gear so that the second worm rotates with the first worm gear. A second worm gear mounted to the roller engages the second worm so that the motor drives the roller via the first worm, the first worm gear, the second worm and the second worm gear. An encoder assembly operatively associated with the second worm provides an indication of the angular position of the second worm. A control system operatively associated with the encoder assembly and the motor operates the motor to drive the roller within a predetermined speed range.

Also disclosed is a method of driving a roller about a roller axis that comprises the steps of: connecting the motor to the roller with a worm gear reduction system which substantially prevents the roller from back-driving the motor; providing an encoder on an intermediate shaft of the worm gear reduction system so that the encoder produces an encoder signal related to the angular position of the roller; calculating a motor drive signal based on the encoder signal; and applying the motor drive signal to the motor so that the motor drives the roller within a predetermined speed range.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
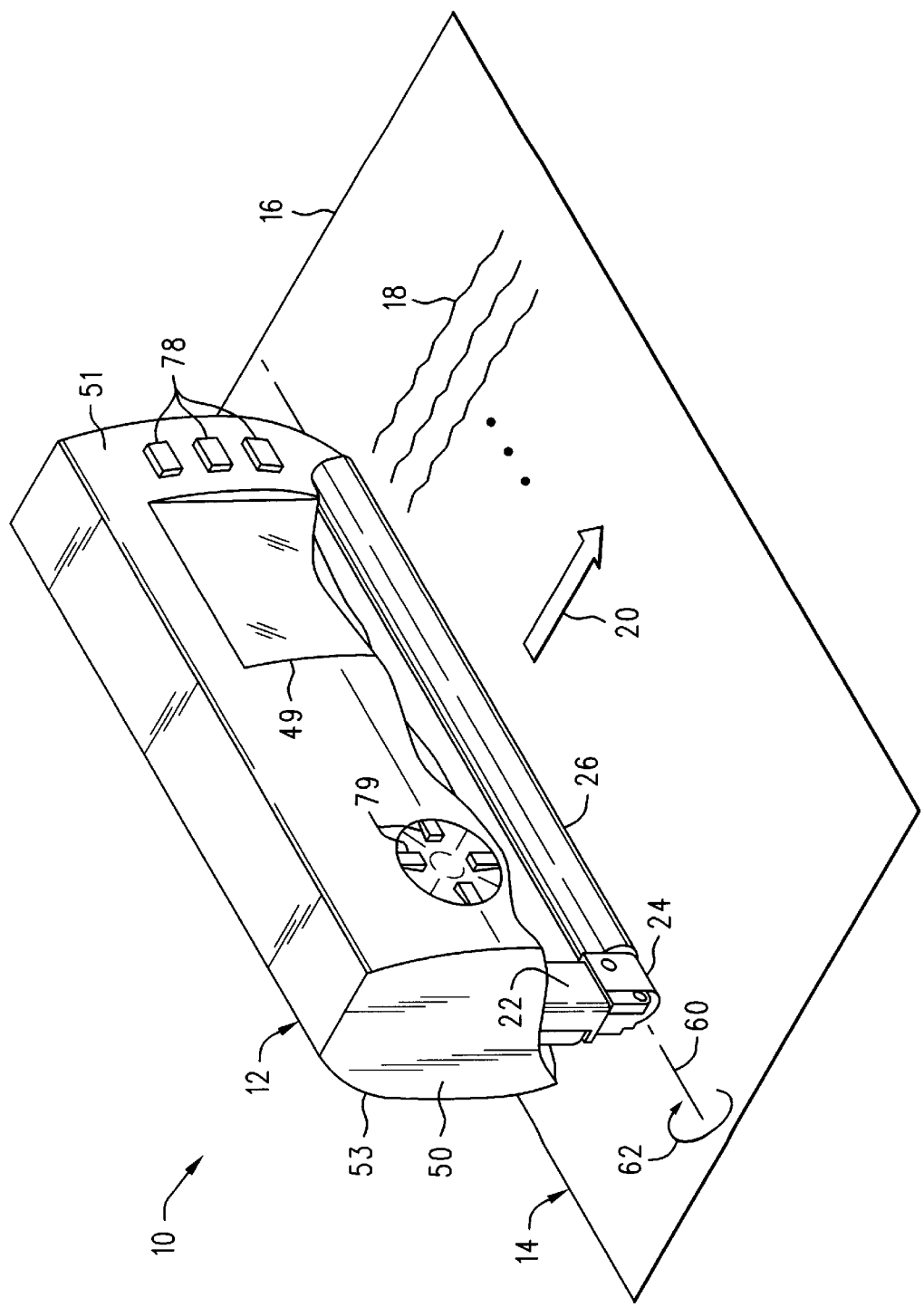
FIG. 1 is a perspective view of a hand-held scanner device utilizing the compact drive system according to the present invention with a portion of the hand-held scanner device broken away to show the compact drive system.
Figure 2:
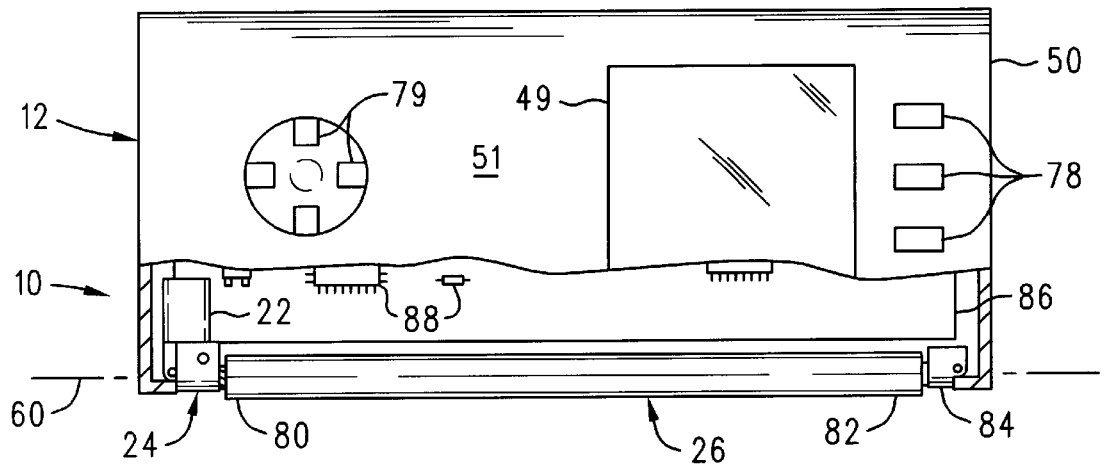
FIG. 2 is a front view of the scanner device shown in FIG. 1 with a portion of the scanner housing broken away to show the position and arrangement of the compact drive system.
Figure 5:
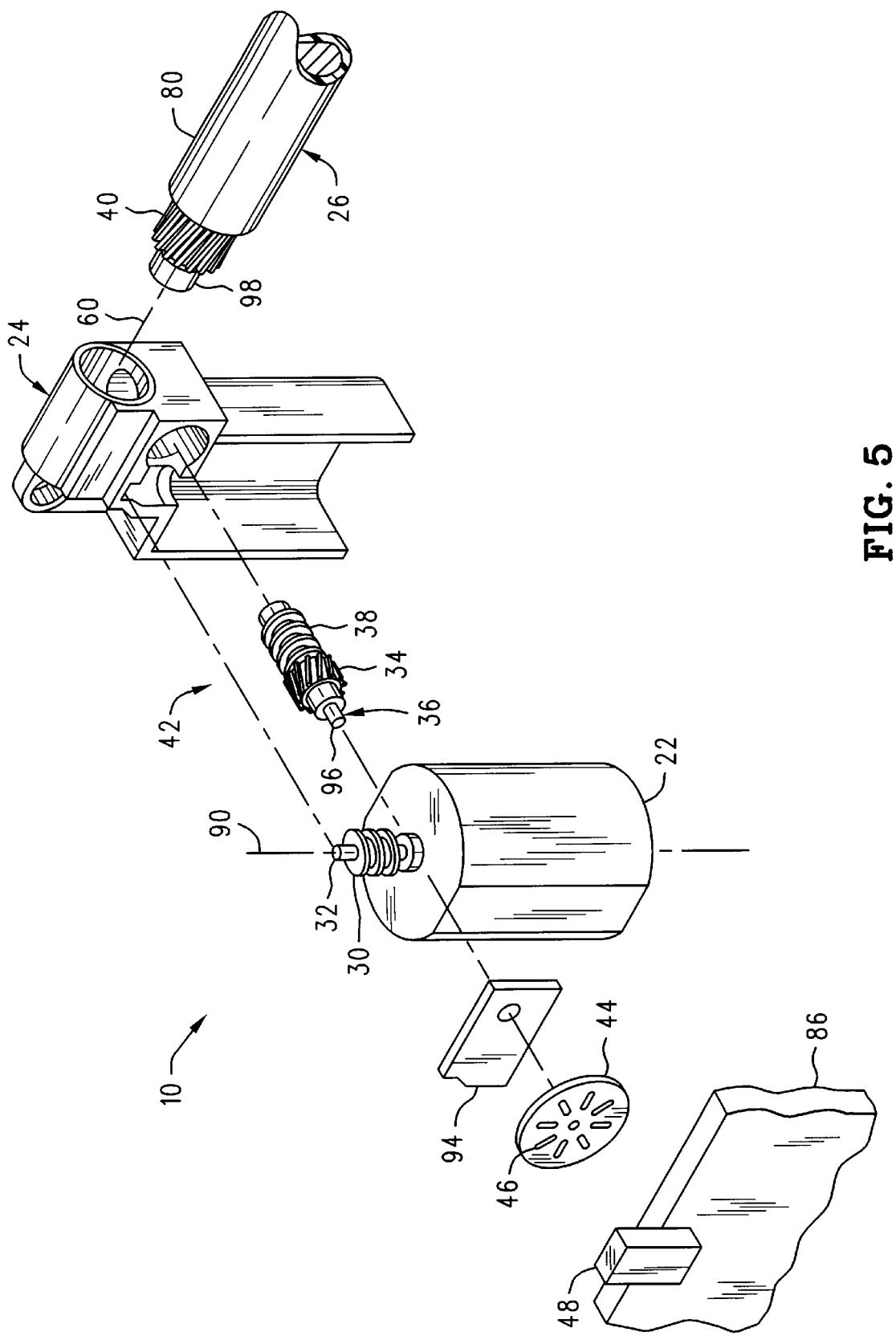
FIG. 5 is an exploded perspective view of the compact drive system.

A compact drive system 10 according to one preferred embodiment of the present invention is shown in FIG. 1 as it could be used in conjunction with a hand-held scanner device 12 of the type used to scan an object 14, such as a document 16 with written text 18 thereon. The document 18 may be scanned by moving the hand-held scanner device 12 in the scanning direction, as indicated by arrow 20. The compact drive system 10 may be mounted within the housing 50 of scanner device 12 and includes a motor 22, a housing 24, and an elongate drive roller 26. The housing 24 contains a worm gear reduction system 42, as best seen in FIG. 5. The motor 22 drives the roller 26 via the worm gear reduction system 42 contained within the housing 24 so that the roller 26 rotates about a roller axis 60. The rotating roller 26 assists the user (not shown) in moving the hand-held scanner device 12 in the scanning direction 20 at the proper speed. A control system 28 (FIG. 8) controls the operation of the compact drive system 10, as will be explained in greater detail below.

Referring now primarily to FIG. 5, the housing assembly 24 of the compact drive system 10 houses a two-stage worm gear reduction system 42 that connects the motor 22 to the elongate drive roller 26. In one preferred embodiment, the two stage worm gear reduction system 42 may comprise a first or motor worm 30 mounted on the output shaft 32 of motor 22. The motor worm 30 engages a first or motor worm gear 34 which is mounted on an intermediate shaft 36. A second or intermediate worm 38 is also mounted on the intermediate shaft 36 so that the intermediate worm 38 rotates with the motor worm gear 34. The intermediate worm 38 engages a second or drive roller worm gear 40 which is attached to the drive roller 26.

As will be explained in greater detail below, both the motor worm 30 and intermediate worm 38 may comprise dual start (i.e., dual thread) worms wherein the lead 52 is twice the pitch 54. See FIG. 6. The motor worm 30 and intermediate worm 38 may have relatively large helix angles for worms, e.g., about 18° in one preferred embodiment, which generally increases the overall efficiency of the worm gear reduction system 42. The first stage (i.e., the motor worm 30 and the motor worm gear 34) of the worm gear reduction system 42 may have a reduction ratio of about 6:1. The second stage (i.e., the intermediate worm 38 and drive roller worm gear 40) may have a reduction ratio of about 8:1. Therefore, the overall reduction ratio of the worm gear reduction system 42 may be about 48:1. Significantly, the arrangement of the worm gear reduction system 42 is such that the roller 26 cannot "back-drive" the motor 22.

Figure 4:
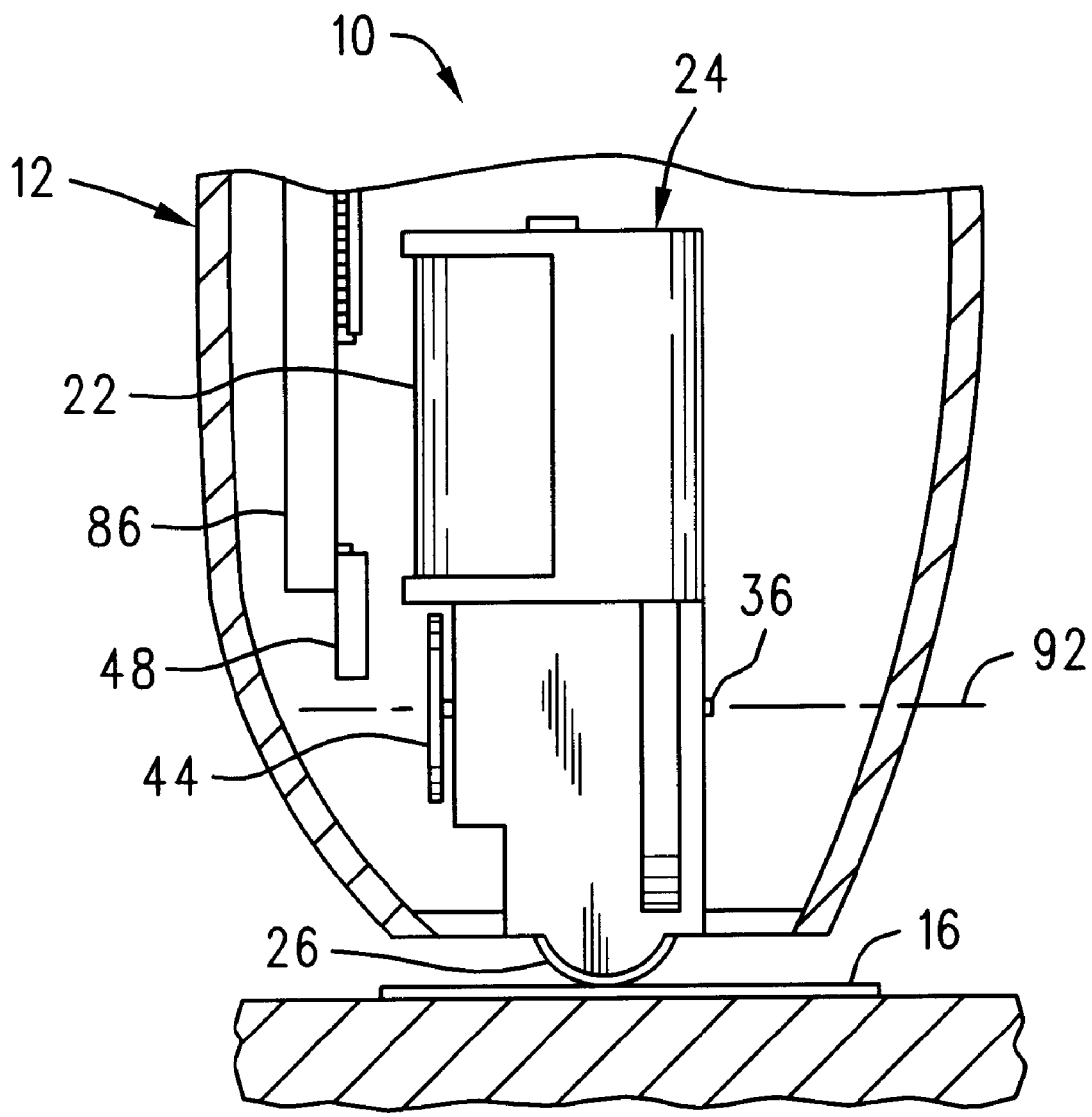
FIG. 4 is an enlarged side view in elevation of the scanner device more clearly showing the arrangement of the encoder wheel and optical detector assembly.

Referring now to FIGS. 4 and 5, an encoder wheel 44 is mounted on the intermediate shaft 36 so that the encoder wheel 44 rotates with the motor worm gear 34 and intermediate worm 38. The encoder wheel 44 includes one or more index marks 46 thereon that are sensed or detected by an optical detector 48 positioned adjacent the encoder disk 44. In one preferred embodiment, the optical detector 48 is mounted on the printed wiring board 86 so that it is positioned a spaced distance from the encoder wheel 44, as best seen in FIG. 4.

Figure 8:
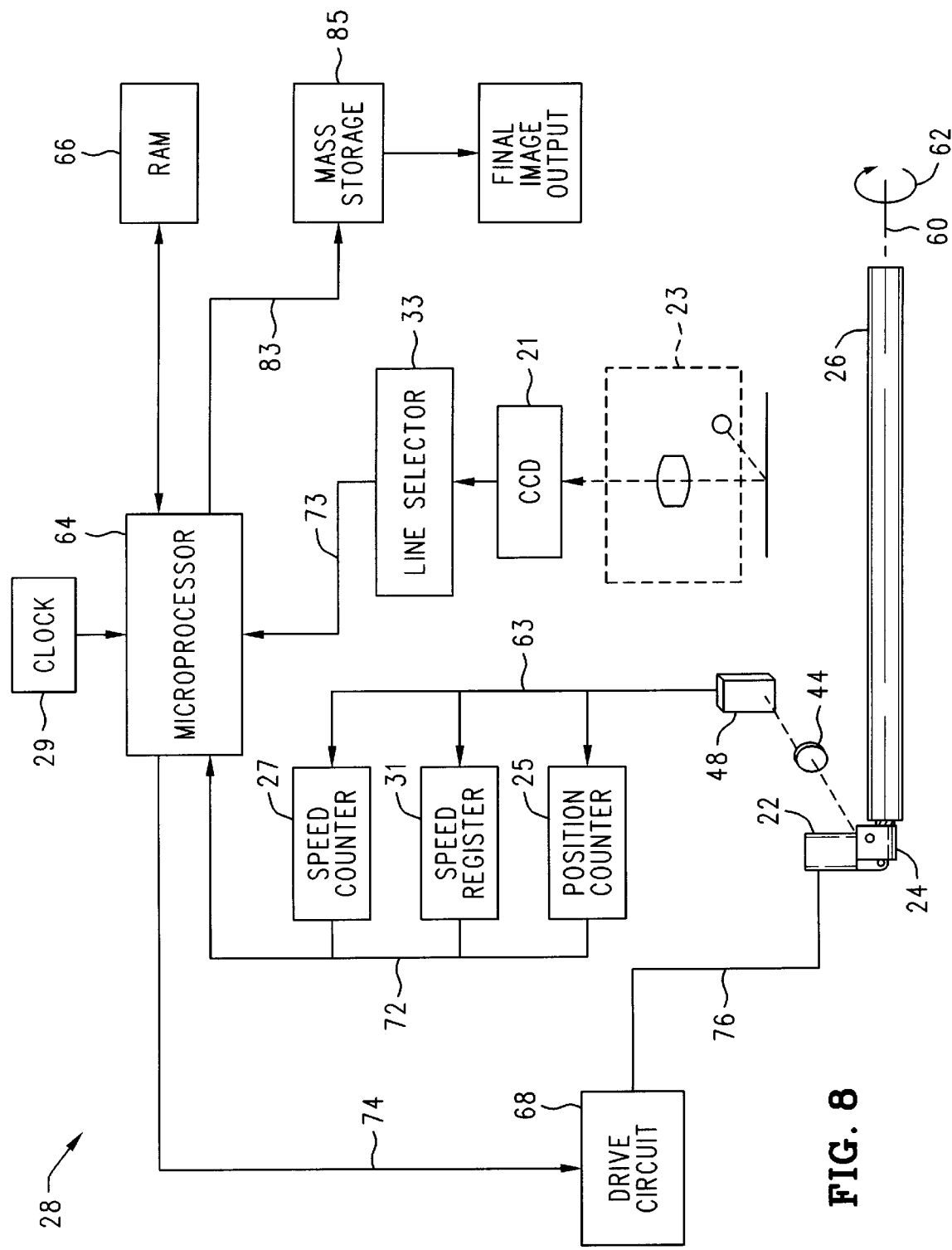
FIG. 8 is a block diagram of the control system used to operate the drive motor and roller assembly.

The control system 28 for controlling the compact drive assembly 10 is shown in FIG. 8 and may comprise a microprocessor system 64, along with an associated clock 29 and random access memory (RAM) 66. A position counter 25, a speed counter 27, and a speed register 31 are connected between detector 48 and microprocessor system 64. The position counter 25, speed counter 27, and speed register 31 receive encoder signals 63 from detector 48, process them, and produce speed and position data signals 72 for the microprocessor system 64. A motor drive circuit 68 connected to the microprocessor 64 receives a motor control signal 74 from the microprocessor 64 and produces a motor drive signal 76 which actuates the motor 22. The microprocessor 64 may also process the image data from the optical assembly 23 of scanner device 14. For example, in one preferred embodiment, the microprocessor 64 may also receive image data signals 73 from the line selector 33 and associated charge coupled device (CCD) 21 associated with the optical system 23 of scanner device 12. The microprocessor 64 may process the image data signals and may store the resulting processed image data 83 in a mass storage device 85. The control system 28 may also include a battery system (not shown) for providing electrical power to the various devices and components thereof.

The compact motor drive system 10 according to one preferred embodiment of the invention may be operated as follows to accomplish scanning of an object 14, such as a document 16 with written text 18 thereon. Referring back now to FIG. 1, the user (not shown) may press the appropriate function keys 78 and scan button 75 (FIG. 3) to prepare the hand-held scanner device 12 for the scanning operation and to initiate the scanning operation. Once the scanning operation is initiated, the control system 28 (FIG. 8) actuates the motor 22 which drives the roller 26 about the roller axis 60. The user (not shown) then moves the hand-held scanner 12 over the document 16 in the scan direction 20. The rotating roller 26 assists the user in moving the hand-held scanner device 12 at the proper scanning speed.

In one preferred embodiment, the scanning speed is controlled by the control system 28 as follows. The rotating encoder disk 44 and optical detector assembly 48 together produce encoder data signals 63 from which may be derived information about the position, speed, and optionally, acceleration, of the drive roller 26. In one preferred embodiment, position data are obtained from the position counter 25, whereas speed data are obtained from the speed counter 27 and speed register 31. The microprocessor 64 processes the speed and position data signals 72 and generates a motor control output signal 74. The drive circuit 68 receives the motor control signal 74 and generates a motor drive signal 76 which provides the drive motor 22 with the current required to produce the torque necessary to rotate the roller 26 at about the target speed. Put in other words, the target scanning speed is provided by the rotating roller 26 which rotates about roller axis 60 at an angular velocity that will produce the desired range of scanning speeds over the object 14. Since the worm gear reduction system 42 will not allow the roller 26 to "back-drive" the motor 22, it is virtually impossible for the user to move the scanner 12 over the object 14 being scanned at a speed greater than that allowed by the rotating roller 26, at least not without causing the roller 26 to slip across the object 14.

A significant advantage of the compact drive system 10 according to the present invention is that is provides in a compact and light-weight package a drive system capable of regulating the scanning speed of a hand-held scanning device 12. The high reduction ratio provided by the worm gear reduction system 42 allows a relatively small, low torque motor 22 to be used, which further decreases the overall size and weight of the drive system 10. Moreover, since the worm gear reduction system 42 also prevents the roller 26 from back-driving the motor 22, the speed control system 28 may be considerably less complicated than it would be if a gear reduction system were used that would allow the roller to back-drive the motor. For example, in the present invention it is not necessary for the control system 28 to provide a reverse torque signal to the motor 22 to counter a back-driving force which would be produced by the user moving the scanner at a speed greater than the target scanning speed.

Still other advantages are associated with the worm gear reduction system 42. For example, the two stage reduction provides for a large reduction ratio (e.g., 48:1), but with a minimum of backlash. The low backlash provides for improved speed control and position tracking. The two stage reduction also allows the worms to have larger helix angles, which increases efficiency, but without significantly increasing the likelihood that the worm gear reduction system 42 will allow the roller 26 to back-drive the motor 22. That is, in most worm gear transmission systems, the helix angle of the drive worm must be less than about 12° if the worm gear is not to back-drive the worm. However, such small helix angles decrease the efficiency of the worm drive system.

Still yet another advantage of the worm gear reduction system 42 is that it provides quiet operation, which allows the hand-held scanner device 12 to be operated without disturbing other persons nearby. Such quiet operation can be a considerable advantage in certain environments, such as libraries.

Another advantage of the present invention is that the encoder disk 44, by being located on the intermediate shaft 36, simultaneously provides for improved position tracking and motor speed information. Position tracking is improved since there is only one gear reduction stage (and associated backlash) between the encoder disk 44 and the roller 26. Motor speed control information is improved for the same reason, i.e., that there is only one gear reduction stage between the encoder disk 44 and the motor output shaft 32. Still another advantage of the present invention is that the optical detector 48 used to detect the index marks 46 on the encoder wheel 44 may be located a spaced distance from the encoder wheel 44 (e.g., on the printed wiring board 86) which obviates the need to provide additional electrical wiring to the compact drive system 10 to carry the encoder data signals 63 from the detector 48 to the control system 28.

Having briefly described the compact drive system 10 according to the present invention, as well as some of its more significant features and advantages, the compact drive system 10 will now be described in detail. However, before proceeding with the description, it should be noted that the compact drive system 10 could be used in with any of a wide variety of hand-held scanner devices that are currently available or that may be developed in the future. Consequently, the compact drive system 10 should not be regarded as limited to use with any particular hand-held scanner device, such as the hand-held scanner device shown and described herein.

Referring back now to FIG. 1, the compact drive system 10 is shown as it could be used with hand-held scanner device 12 to scan an object 14, e.g., a document 16 with written text 18 thereon. In one preferred embodiment, the compact drive system 10 is mounted within the housing 50 of hand-held scanner device 12 and may comprise a motor assembly 22, a housing assembly 24, and an elongate roller assembly 26. The motor 22 drives (i.e., rotates) the roller 26 so that it rotates about the roller axis 60 in the direction indicated by arrow 62. The rotating roller 26 assists the user (not shown) in moving the hand-held scanner device 12 in the scan direction 20 at the appropriate speed. Alternatively, of course, the roller 26 could be driven in the opposite direction to allow scanning to occur in the opposite direction (i.e., opposite arrow 20).

Figure 3:
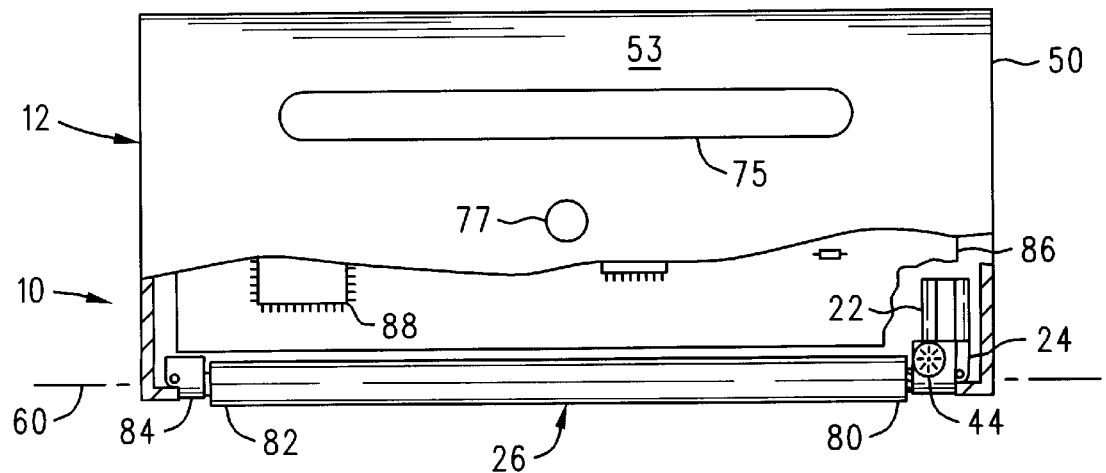
FIG. 3 is a rear view of the scanner device shown in FIG. 1 with a portion of the scanner housing broken away to show the compact drive system.

As mentioned above, the hand-held scanner device 12 may comprise any of a wide range of hand-held scanner devices that are currently readily commercially available. In one exemplary application the hand-held scanner device 12 may include a housing or body 50 configured to receive the various internal components and systems of the scanner 12 as will as the compact drive system 10. For example, the front side 51 of body 50 may include a plurality of function buttons or keys 78 and scrolling buttons or keys 79. The front side 51 may also include a display device, such as a liquid crystal display 49, for displaying data relating to the function and operation of the scanner 12. The rear side 53 of body 50 may be provided with a scan button 75 and an on/off switch 77, as best seen in FIG. 3. The various function buttons 78, scrolling buttons 79, scan button 75, and on/off switch 77 may be used by the user (not shown) to control the various functions of the hand scanner 12 and to initiate and terminate scanning of the document 16. Alternatively, the various components of the hand-held scanner device may be arranged in other configurations.

Referring now to FIGS. 1–4, the body 50 may be configured to receive the compact drive assembly 10 as well as an optical assembly 23 (shown schematically in FIG. 8) suitable for capturing image data from the object 14 being scanned. The body 50 may also include a printed wiring board 86 which supports a plurality of electronic components 88, some of which may comprise the control system 28 and others of which may comprise the electronic image data processing system associated with the optical system 23. Finally, the body 50 of scanner 12 may also be adapted to include an electrical power source, such as a battery (not shown) suitable for supplying the various components of the hand-held scanner device 12 with electrical power.

The compact drive system 10 comprises four major sub-assemblies: A motor 22, a housing assembly 24, a drive roller 26, and an electronic control system 28 (FIG. 8). In one preferred embodiment, the motor 22 and housing assembly 24 are mounted at one end of the body 50 of scanner 12 so that the roller 26 extends along the bottom of the housing 50. See FIGS. 1–3. The proximal end 80 of roller 26 is mounted for rotation within the housing assembly 24 by any convenient bearing device, such as a ball bearing 98 (FIG. 5). Similarly, the distal end 82 is mounted for rotation within an end bearing assembly 84 also by any convenient bearing device, e.g., a ball bearing (not shown). The mounting arrangement allows the drive roller 26 to rotate about the drive roller axis 60. The housing assembly 24 and end bearing assembly 84 may be secured within the housing 50 by any convenient means, such as by screws or a mounting structure (not shown) which may be integrally molded into the housing 50.

The housing assembly 24 is sized to receive the motor 22 and the worm gear reduction system 42, as best seen in FIG. 5. The motor 22 may comprise any of a wide range of permanent magnet d.c. motors of the type that are readily commercially available. Alternatively, other types of motors could be used and the present invention should not be regarded as limited to any particular type or style of motor.

The worm gear reduction system 42 couples the motor 22 to the drive roller 26 and comprises a two-stage reduction system. The first stage comprises a first or motor worm 30 and a first or motor worm gear 34. The motor worm 30 is mounted to the output shaft 32 of motor 22 which is aligned along an output shaft axis 90. The motor worm gear 34 is mounted on an intermediate shaft 36 which is aligned along an intermediate axis 92. The intermediate shaft 36 is positioned within the housing assembly 24 so that the intermediate shaft 36 is substantially perpendicular to output shaft 32 of motor 22 and so that the first or motor worm gear 34 engages the motor worm 30.

The second stage of the worm gear reduction system 42 comprises a second or intermediate worm 38 and a second or roller worm gear 40. The intermediate worm 38 is mounted on the intermediate shaft 36 so that the intermediate worm 38 and motor worm gear 34 rotate together on intermediate shaft 36. The roller worm gear 40 is attached to the proximal end 80 of drive roller 26. As was mentioned above, the proximal end 80 of drive roller 26 is mounted for rotation in the housing assembly 24 by any convenient bearing device, such as a ball bearing 98, so that the drive roller 26 may rotate about the drive roller axis 60. An end plate 94 supports the proximal end 96 of intermediate shaft 36 and protects the worm gear reduction system 42 from dirt and other contaminants.

The housing assembly 24 may be made from any of a wide range of materials, such as metals or plastic materials, suitable for the intended application. In one preferred embodiment, the housing assembly 24 may be molded as a single piece from carbon fiber reinforced polycarbonate plastic. Similarly, the cover 94 may be molded as a single piece from the same material and may be fastened to the housing assembly 24 by any of a wide variety of fasteners, such as screws. Alternatively, the cover plate 94 may be provided with one or more securing devices (not shown) which engage mating devices provided on the housing assembly 24 to allow the two pieces to be snapped together. In still another mounting arrangement, the cover plate 94 may be secured to the housing assembly 24 by any of a wide range of adhesive materials.

Figure 6:
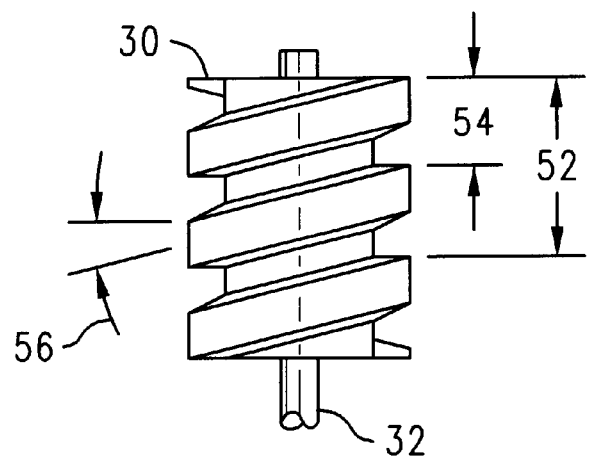
FIG. 6 is an enlarged side view of the motor worm.

Each worm (e.g., worms 30 and 38) may comprise a dual start (i.e., dual thread) worm wherein the lead 52 is twice the pitch 54. See FIG. 6 (only worm 30 is shown in FIG. 6, but worm 38 is similar). The dual thread configuration for each of the worms 30 and 38 allows each worm (e.g., worm 30 in FIG. 6) to have a relatively large helix angle 56. For example, in one preferred embodiment, each worm 30, 38 may have a helix angle (e.g., angle 56) in the range of about 14° to about 22° (18° preferred), although other helix angles could also be used. The relatively large helix angle 56 increases the overall efficiency of the worm gear reduction system 42. In this regard, it should be noted that a worm having a helix angle greater than about 12° may be back-driven in certain applications. That is, it may be possible for the worm gear to drive the worm, instead of the other way around, which is the normal arrangement. However, the two stage reduction provided by the worm gear reduction system 42 of the present invention discourages such back-driving, even with the relatively large helix angles provided by the dual thread worms. Therefore, the worm gear reduction system 42 according to the present invention simultaneously provides the advantages of high efficiency and resistance to back drive.

Figure 7:
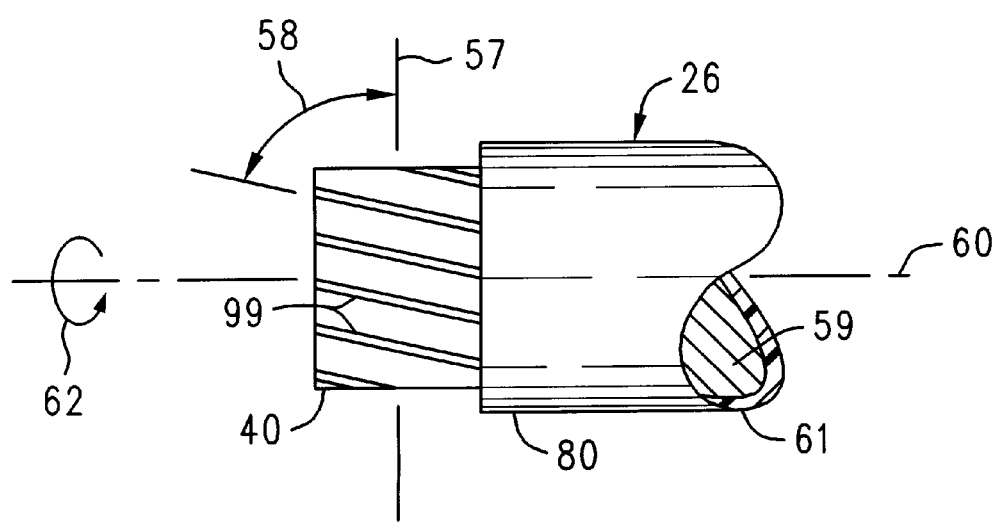
FIG. 7 is an enlarged side view of the drive roller worm gear.

The worm gears 34, 40 that engage the respective worms 30 and 38 may be of generally conventional design. For example, referring now to FIG. 7, worm gear 40 may comprise a plurality of teeth 99 inclined at a helix angle 58 with regard to an axis 57 transverse to the roller axis 60. The helix angle 58 is the complement of the helix angle (e.g., 56) of its mating worm (e.g., 30) for 90° shaft angles. Accordingly, in one preferred embodiment wherein the helix angle 56 of each worm 30, 38 is in the range of about 14° to about 22° (18° preferred), the helix angle 58 of each worm gear 34, 40 is in the range of about 68° to about 76° (72° preferred).

The various worms 30 and 38 and worm gears 34 and 40 may be made from any of a wide range of materials, such as metals or plastic materials, depending on the particular application. In one preferred embodiment, the worms 38 and 38 and worm gear 34 are molded from nylon "loaded" (i.e., mixed) with molybdenum disulfide. Similarly, the second worm gear 40 is molded from molybdenum disulfide loaded nylon.

The roller 26 may comprise an elongate shaft member 59 covered by a sleeve 61. The shaft 59 may be made from any of a wide range of materials, such as metals or plastic materials, suitable for the intended application. The sleeve 61 may comprise any of a wide range of materials suitable for engaging the object 14 which is to be scanned. Examples of such materials include various rubber and plastic materials. In one preferred embodiment, the shaft 59 is fabricated from stainless steel, whereas the sleeve 61 comprises rubber.

Referring now to FIGS. 4 and 5, the encoder disk 44 is mounted to the proximal end 96 of intermediate shaft 36 so that the encoder disk 44 rotates with the motor worm gear 34 and intermediate worm 38. The encoder disk 44 may include at least one index mark 46 thereon that is detectable by the detector assembly 48. The encoder disk 44 may be made from any of a wide range of materials (e.g., metals or plastics) suitable for the intended application. In one preferred embodiment, the encoder disk 44 comprises etched stainless steel. The index marks 46 may comprise any mark or feature that is readily detectable by the detector 48. For example, in one preferred embodiment wherein the detector 48 comprises a light source and a light sensitive detector, the index marks 46 may comprise a holes or slots in the stainless steel encoder disk. The detector 48 then detects the differences in reflectance between the stainless steel disk and the holes or slots therein. Alternatively, of course, the encoder disk could be made from a non-reflective material and the index marks 46 thereon may comprise a reflective material. Any convenient number of index marks 46 may be placed on the disk 44. In one preferred embodiment, fifty-four (54) index marks 46 are spaced evenly around the disk 44.

As was mentioned above, the detector assembly 48 comprises a device for detecting the various index marks 46 on the disk 44, but without contacting the disk 44. It is preferred that the detector assembly 48 be located a spaced distance from the disk 44, such as on the printed wiring board 86, as best seen in FIG. 4. In one preferred embodiment, the detector assembly 48 comprises a small light source (not shown) for illuminating a small area on the encoder disk 44 and a detector (not shown) for detecting the presence of an index mark 46 within the illuminated area and for generating an output signal or signals related thereto. By way of example, the detector assembly 48 may comprise a model no. HEDR-8000 optical detector available from Hewlett-Packard Company of Palo Alto, Calif. Alternatively, other types of detectors may be used.

As will be described in greater detail below, the encoder disk 44 and detector assembly 48 may comprise a quadrature encoder assembly which provides two pulses: a first or A pulse and a second or B pulse that are 90 degrees out of phase. Such a quadrature encoder assembly not only provides a means to keep track of the displacement of the scanner, but also the direction (i.e., either forward or backward) of the displacement. Alternatively, however, the encoder disk 44 and detector assembly 48 could comprise a relatively simple AM (amplitude modulated) encoder assembly which produces only a single pulse.

The control system 28 for controlling the compact drive system 10 is best seen in FIG. 8 and may comprise a plurality of components that cooperate with the microprocessor system 64. In one preferred embodiment, the control system 28 may be integrated with the optical image data processing section of the hand-held scanner device 12. Alternatively, the control system 28 could comprise a "stand-alone" system, generally independent from the optical image data processing section. In any event, the control system 28 may comprise a microprocessor system 64, along with an associated clock system 29 and random access memory (RAM) system 66. A position counter 25, a speed counter 27, and a speed register 31 are connected between the detector assembly 48 and the microprocessor 64 and receive encoder data signals 63 from the detector assembly 48. The position counter 25, speed counter 27, and speed register 31 process the encoder data signals 63 in various manners that will be described below to produce position and speed data signals 72. A drive circuit 68 connected between the microprocessor 64 and the motor 22 receives the motor control signal 74 from the microprocessor 64 and produces a motor drive signal 76 which actuates the motor 22. In one preferred embodiment, the drive circuit 68 comprises a pulse width modulator implemented in a field programmable gate array. Alternatively, the drive circuit 68 may comprise any of a wide range of pulse width modulated control circuits which are readily commercially available. Essentially, the pulse width modulator comprising the drive circuit 68 regulates the effective voltage applied to the motor 22 by altering the width (i.e., duty cycle) of the voltage pulses applied to the motor 22. However, since pulse width modulators are well-known, the particular pulse width modulator that comprises the drive circuit 68 will not be described in further detail.

As was mentioned above, the microprocessor system 64 may also be connected the image processing section of the hand-held scanner device 12. For example, the microprocessor system 64 may be connected to a line selector 33 which is in turn connected to a photoelectric conversion device, such as a CCD 21. The line selector 33 produces image data signals 73 which may then be processed by the microprocessor system 64 to produce processed image data 83. Processed image data 83 from the microprocessor system 64 may then be subsequently stored in a mass storage device 85. Alternatively, the processed image data 83 may be sent directly to an external computer (not shown). In any event, since the processing of image data, such as image data 73, by hand-held scanner devices is well-known, the image data processing system associated with the hand-held scanner device 12 will not be discussed in further detail.

The microprocessor system 64 may comprise any of a wide range of microprocessor systems that are readily commercially available. In one preferred embodiment, the microprocessor system 64 may comprise a model no. SH1 microprocessor available from Hitachi Corp. of Japan. Alternatively, the microprocessor 64, as well as the various other electronic components and systems (e.g., the position counter 25, speed counter 27, speed register 31, and drive circuit 68) could be incorporated in a single, application specific integrated circuit (ASIC). In any event, since such devices are well-known in the art and could be easily provided by persons having ordinary skill in the art after having become familiar with the teachings of the present invention, the various electronic components and devices utilized in one preferred embodiment of the present invention will not be described in further detail herein.

The control system 28 controls the operation of the compact drive system 10 and regulates the rotational speed of the drive roller 26. Generally speaking, the control system 28 varies the torque output of drive motor 22 to ensure that the scanner speed remains at about a predetermined target speed. The magnitude of the torque applied by the motor 22 to the worm gear reduction system 42 is based on a comparison of the current value of scanner velocity and acceleration to the predetermined target speed. In one embodiment, the target speed may be selected to be about 95% of the maximum speed at which the scanner can operate based upon the sampling rate of the photoelectric conversion device (e.g., CCD 21), although other target speeds could be used. The control system 28 maintains the scanner speed to a speed within about ±5% of the predetermined target speed. Since the worm drive reduction system 42 prevents the roller 26 from back-driving the motor 22, the control system 28 need not actuate the motor 22 to apply a reverse torque to the worm gear reduction system 42.

As mentioned above, the motor 22 is responsive to a voltage supplied by the motor drive circuit 68 and supplies a torque to the worm gear reduction system 42 which acts to move scanner 12 over the object 14 to be scanned. See FIG. 1. The displacement of the scanner 12 over the object 14 is tracked by means of the position counter 25. In one preferred embodiment, the encoder disk 44 and detector assembly 48 together comprise a quadrature encoder which provides two pulses, a first or A pulse and a second or B pulse, that are 90 degrees out of phase. The resolution of encoder 44 and the drive gear ratio and roller circumference in one preferred embodiment are such that the A pulse provides a rising edge at about every 0.0847 mm (1/300") of scanner travel. The second pulse or the B pulse maintains and increments the position counter 25 on every rising edge of the A pulse when the scanner 12 is moving forward. The B pulse de-increments the position counter 25 on the falling edge of the A pulse when the scanner 12 is moving backward (i.e., opposite the scan direction 20). The position counter 25 is reset each time the scan switch 75 (FIG. 3) is depressed. The position counter 25 thus provide a means to keep track of the position or displacement of the scanner 12.

The speed counter 27 counts the number of clock pulses produced by clock 29 since the last encoder pulse was received. Speed counter 27 is reset on the rising edge of the A pulse when the scanner 12 is moving forward (i.e., in the direction of arrow 20 (FIG. 1)). While clock 29 may operate at a variety of frequencies, a frequency of about 20 kHz will provide adequate resolution for the velocity and acceleration determinations that will be described below.

The speed register 31 counts the number of clock pulses between two consecutive encoder pulses. In the embodiment having a 20 kHz clock 29, the number of clock pulses divided by 20,000 will be the elapsed time, in seconds, between the two consecutive encoder pulses. Since there is one encoder pulse every 0.0847 mm (1/300") of scanner travel, the velocity of the scanner in mm/s will be 0.0847 divided by the elapsed time in seconds. Of course, the scanner acceleration can be determined by dividing the difference between two consecutive velocity determinations by the elapsed time.

The microprocessor system 64 collects position and speed data 72 from the speed counter 27, speed register 31, and position counter 25 and determines the position, direction, velocity, and acceleration of the scanner 12, and then determines the proper torque voltage to be applied to the motor 22 to keep the scanner 12 moving at about the predetermined target speed. As mentioned above, the drive circuit 68 may comprise a pulse width modulator which regulates the effective voltage applied to the motor 22 by change the duty cycle (i.e., pulse width) of the voltage applied to the motor 22. The change in the duty cycle ($\Delta N$) for the drive circuit 68 is determined from the velocity and acceleration of the scanner 12 according to the following equation:

$$\Delta N = \frac{2(a_s) + v_s - v_t}{\left(\frac{v_t}{4}\right)}$$

Where:
$\Delta N$=is the change in duty cycle;
$a_s$=the most recently calculated scanner acceleration (i.e., change in the number of clock ticks per scan line) a negative value indicates an accelerating scanner, while a positive value indicates a decelerating scanner;
$v_s$=the most recently calculated scanner velocity (number of clock ticks per scan line); and
$v_t$=the predetermined target velocity (the number of clock ticks per scan line that would occur at the target velocity).

The determination of the change of duty cycle $\Delta N$ is thus straightforward, with the values of $a_s$, $v_s$, and $v_t$ being integers corresponding to the number of clock ticks.

The value of the predetermined target velocity $v_t$ is converted into a integer based on the number of counts that are equivalent to the desired velocity in any convenient units, such as mm/sec.

It should be noted that the duty cycle N for the drive circuit 68 is updated at the end of each scan line, not at the end of each encoder pulse. This is because the photoelectric conversion device (e.g. CCD 21) operates independently of the encoder 44. That is, the line selector 33 sends an interrupt signal to microprocessor 64 as soon as a line has been scanned, which may or may not correspond to an encoder pulse. It is at this point that the microprocessor 64 determines the scanner velocity and acceleration and updates that duty cycle. Consequently, the number of clock pulses counted by speed counter 27 at the scan line interrupt will generally not be zero, indicating that the encoder 44 is between pulses. If the most recently calculated scanner velocity $v_s$ is lower than the value (i.e., number of clock ticks) in the speed counter 27, indicating that the scanner has slowed, then the current $v_s$ is replaced by the number of clock ticks currently in speed counter 27. Such replacement of the most recently calculated $v_s$ with the number of clock ticks in counter 27 tends to give a more accurate indication of the current velocity of the scanner.

The current or "new" duty cycle $N_{new}$ is determined by adding $\Delta N$ to the previous or "old" duty cycle $N_{old}$. If $N_{new}$ is greater than 255, then $N_{new}$ is set at 255, which represents maximum motor torque. If $N_{new}$ is determined to be less than zero, then $N_{new}$ is set at zero, which represents no motor torque.

The value used as the denominator, i.e., $v_t/4$ is empirically determined and serves to reduce the sensitivity of the control system 28 to provide smooth response. Additional smoothness of response is achieved by limiting the increase or decrease in the duty cycle between consecutive calculations to no more than 4 counts. Put in other words, N is not allowed to change by more than 4 between any two consecutive determinations, e.g., an increase from about 150 to 154 or a decrease from about 150 to 146. If $\Delta N$ is calculated to be more than 4, the microprocessor 64 automatically programs the drive circuit 68 to limit the change in duty cycle (i.e., $\Delta N$) to 4.

It should be noted that the value of the denominator (i.e., $v_t/4$) and the maximum allowed change in $\Delta N$ are related to a number of parameters, including the particular control system configuration, number of steps that the duty cycle (i.e., N) is allowed to have, as well as the desired response of the scanner 12 to speed variations. Therefore, it would be obvious to persons having ordinary skill in the art to change the value of the denominator (i.e., $v_t/4$) or the maximum allowed change in N (i.e., 4) depending on the specific control system configuration or the desired scanner response characteristics.

To initiate scanning, the operator places the scanner 12 over the object 14 being scanned and depresses the scan switch 75 (FIG. 3). At this point, the microprocessor 64 determines a zero velocity and programs the drive circuit 68 to increase the duty cycle, thus accelerating torque, of motor 22. Since the maximum increase in duty cycle is limited, the effect is a steady increase or "ramp up" of motor torque, thus velocity, thereby providing the operator with a favorable tactile "feel" of operation. Once the scanner 12 has been accelerated to the predetermined target speed, the control system 28 varies the torque output of motor 22 to maintain the scanning speed within about ±5% of the target speed. Less torque will be required if the operator is assisting the rolling movement of the scanner 12, while more torque will be required if the operator is resisting the rolling movement of the scanner 12. Since the worm gear reduction system 42 prevents the roller 26 from back-driving the motor 22, it will not be possible for the operator to non-slippingly roll the scanner 12 at a speed faster than it is being rolled by the compact drive system 10, thereby providing effective control of maximum scanning speed.

It is contemplated that the inventive concepts herein described may be variously otherwise embodied and it is intended that the appended claims be construed to include alternative embodiments of the invention except insofar as limited by the prior art.

What is claimed is:

1. A compact drive assembly for a hand-held scanner device, comprising:
    a roller mounted for rotation in the hand-held scanner device;
    a motor having an output shaft;
    a first worm mounted to the output shaft of said motor;
    a first worm gear operatively associated with said first worm;
    a second worm operatively associated with said first worm gear so that said second worm rotates with said first worm gear;
    a second worm gear mounted to said roller and operatively associated with said second worm so that said motor drives said roller via said first worm, said first worm gear, said second worm and said second worm gear;
    an encoder assembly operatively associated with said second worm, said encoder assembly providing an indication of the angular position of said second worm; and
    a control system operatively associated with said encoder assembly and said motor, said control system operating said motor to drive said roller within a predetermined speed range.

2. The compact drive assembly of claim 1, wherein said encoder assembly comprises an encoder disk mounted to said second worm, said encoder disk including at least one index mark, and a detector assembly mounted adjacent said encoder disk for detecting said index mark.

3. The compact drive assembly of claim 1, wherein said first worm comprises a double thread worm.

4. The compact drive assembly of claim 3, wherein said second worm comprises a double thread worm.

5. The compact drive assembly of claim 1, wherein said first worm gear is mounted on an intermediate shaft, said intermediate shaft extending along an intermediate shaft axis and wherein the output shaft of said motor extends along an output shaft axis, the intermediate shaft axis being substantially perpendicular to the output shaft axis.

6. The compact drive assembly of claim 5, wherein said roller is mounted for rotation about a roller axis, said roller axis extending in a direction that is substantially perpendicular to the intermediate shaft axis.

7. The compact drive assembly of claim 6, wherein said roller axis is also substantially perpendicular to the output shaft axis.

8. The compact drive assembly of claim 1, wherein said first worm has a helix angle in the range of about 14° to about 22°.

9. The compact drive assembly of claim 8, wherein said second worm has a helix angle in the range of about 14° to about 22°.

10. The compact drive assembly of claim 9, wherein said first worm and said first worm gear comprise a gear ratio of about 6:1.

11. The compact drive assembly of claim 10, wherein said second worm and said second worm gear comprise a gear ratio of about 8:1.

12. A compact drive assembly for a hand-held scanner device, comprising:
    a roller mounted for rotation about a roller axis;
    a motor having an output shaft, the output shaft of said motor extending along an output shaft axis;
    a first worm mounted to the output shaft of said motor;
    an intermediate shaft extending along an intermediate shaft axis, the intermediate shaft axis extending along a direction that is non-parallel to and non-intersecting with the output shaft axis;
    a first worm gear mounted on said intermediate shaft so that said first worm gear engages said first worm;
    a second worm mounted on said intermediate shaft so that said second worm turns with said first worm gear;
    a second worm gear mounted to said roller and engaging said second worm so that the roller axis is non-parallel to and non-intersecting with the intermediate shaft axis, whereby said motor rotates said roller about the roller axis via said first worm, said first worm gear, said second worm and said second worm gear;
    an encoder assembly operatively associated with said second worm, said encoder assembly providing an indication of the angular position of said second worm; and
    a control system operatively associated with said encoder assembly and said motor, said control system operating said motor to drive said roller within a predetermined speed range.

13. The compact drive assembly of claim 12, wherein said encoder assembly comprises:
    an encoder disk mounted to the intermediate shaft so that said encoder disk rotates with said second worm, said encoder disk including at least one index mark; and
    a detector assembly positioned adjacent said encoder disk for detecting said index mark and for generating an output signal relating to the detection of said index mark.

14. The compact drive assembly of claim 13, wherein said control system is electrically connected to said motor and to said detector, said control system being responsive to the output signal produced by said detector, said control system operating said motor so that said roller rotates within a predetermined range of angular velocities.

15. The compact drive assembly of claim 12, wherein said first and second worms comprise double thread worms.

16. The compact drive assembly of claim 12, wherein a helix angle of said first worm is in the range of about 14° to about 22° and wherein a helix angle of said second worm is in the range of about 14° to about 22°.

17. The compact drive assembly of claim 12 further comprising a housing adapted to receive said motor, said intermediate shaft, said first and second worms and said first and second worm gears, said housing also adapted to receive a first end of said roller.

* * * * *